US008061042B2

(12) United States Patent
Arnetoli

(10) Patent No.: US 8,061,042 B2
(45) Date of Patent: Nov. 22, 2011

(54) MOWING HEAD WITH PERIPHERAL MEMBERS FOR ENGAGEMENT OF THE CUTTING LINE

(75) Inventor: Fabrizio Arnetoli, Florence (IT)

(73) Assignee: Arnetoli Motor S.r.l., Reggello, Firenze (IT)

( * ) Notice: Subject to any disclaimer, the term of this patent is extended or adjusted under 35 U.S.C. 154(b) by 141 days.

(21) Appl. No.: 11/531,131

(22) Filed: Sep. 12, 2006

(65) Prior Publication Data

US 2007/0214655 A1 Sep. 20, 2007

(30) Foreign Application Priority Data

Sep. 13, 2005 (IT) .................. FI05A000191

(51) Int. Cl.
 *A01G 3/06* (2006.01)
(52) U.S. Cl. ........................... 30/276; 30/347
(58) Field of Classification Search .............. 30/276, 30/347; 24/134 P
 See application file for complete search history.

(56) References Cited

U.S. PATENT DOCUMENTS

| 4,035,912 | A | * | 7/1977 | Ballas et al. ............ 30/276 |
| 4,043,037 | A | * | 8/1977 | Okamoto et al. ........ 30/276 |
| 4,062,115 | A | | 12/1977 | Lee |
| 4,199,926 | A | | 4/1980 | Petty |
| 4,290,200 | A | * | 9/1981 | Lombard ............. 30/276 |
| 4,301,642 | A | * | 11/1981 | Thurber ............. 56/12.7 |
| 4,411,069 | A | * | 10/1983 | Close et al. ............ 30/276 |
| 4,651,421 | A | * | 3/1987 | Zerrer ............... 30/347 |
| 4,756,146 | A | | 7/1988 | Rouse |
| 4,852,258 | A | * | 8/1989 | Foster ............... 30/276 |
| 4,905,465 | A | | 3/1990 | Jones et al. |
| 5,023,998 | A | | 6/1991 | Masciarella et al. |
| 5,303,476 | A | | 4/1994 | Tuggle |
| 5,401,011 | A | * | 3/1995 | Gatenby et al. ........ 269/131 |
| 5,433,006 | A | | 7/1995 | Taguchi |
| 5,617,636 | A | * | 4/1997 | Taggett et al. ......... 30/276 |
| 5,758,424 | A | | 6/1998 | Iacona et al. |
| 5,887,348 | A | | 3/1999 | Iacona et al. |
| 5,896,666 | A | * | 4/1999 | Iacona et al. .......... 30/276 |
| 6,052,974 | A | * | 4/2000 | Harb ............... 56/12.7 |
| 6,295,700 | B1 | * | 10/2001 | Plzak .............. 24/134 R |
| 6,347,455 | B2 | * | 2/2002 | Brant et al. ........... 30/276 |
| 6,519,857 | B1 | * | 2/2003 | Proulx et al. .......... 30/276 |
| 6,581,292 | B2 | * | 6/2003 | Allis ................ 30/276 |
| 6,928,741 | B2 | * | 8/2005 | Proulx et al. .......... 30/276 |
| 2001/0003935 | A1 | * | 6/2001 | Morabit et al. ........ 83/13 |
| 2002/0129498 | A1 | * | 9/2002 | Berfield ............. 30/276 |
| 2004/0045166 | A1 | * | 3/2004 | Hobday et al. ........ 30/123.3 |
| 2006/0026846 | A1 | * | 2/2006 | Alliss ............... 30/276 |

* cited by examiner

*Primary Examiner* — Kennth E. Peterson
*Assistant Examiner* — Jennifer Swinney
(74) *Attorney, Agent, or Firm* — McGlew and Tuttle, P.C.

(57) ABSTRACT

The mowing head (1) comprises: a body (3), which can be engaged to a motor shaft and defines a peripheral edge (3C); at least one member for anchorage (9) of a cutting line (F), with an elastically loaded eccentric oscillating element, which co-operates with a surface of contrast fixed to the body for anchoring said cutting line. The oscillating element (11) projects from the peripheral edge of the body of the mowing head with a knurled edge (11Z), which forms a gripping surface for causing oscillation of the oscillating element and release of the cutting line.

24 Claims, 5 Drawing Sheets

US 8,061,042 B2

MOWING HEAD WITH PERIPHERAL MEMBERS FOR ENGAGEMENT OF THE CUTTING LINE

TECHNICAL FIELD

The present invention relates to improvements to mowing or trimming heads for brush cutters or the like, and more in particular to mowing heads that use cutting line elements for cutting vegetation.

STATE OF THE ART

In gardening, frequently tools are used for cutting vegetation, and in particular for cutting grass, which are based upon the use of cutting lines. The latter are made to project radially from mowing heads, which, fitted to the end of a rotating shaft, are made to rotate at a high speed. The centrifugal force radially extends the lines projecting from the mowing head, so that by rotating they cut the vegetation.

In some mowing heads of this type, the cutting line is applied in the form of single lengths, one end of which is anchored to the mowing head whilst the opposite end projects radially from the mowing head itself. The length of the individual lengths or portions of cutting line is sufficient to carry out cutting of a certain amount of vegetation. Once the lengths of cutting line are worn out, they are simply replaced with new lengths. Examples of mowing heads of this type are described in the U.S. Pat. Nos. 5,896,666, 5,758,424, 5,887,348.

The mowing heads described in the above U.S. patents have a rotating body, which can be engaged to a motor shaft and defines a peripheral, i.e., perimetral edge, along which members for anchorage of lengths of cutting line are arranged. Each anchorage member has an eccentric oscillating element elastically loaded against a surface of contrast fixed to the body of the mowing head. The length of cutting line is blocked against the mowing head as a result of the elastic loading exerted by the eccentric oscillating element against the contrast surface. The centrifugal force that is generated during rotation, which is applied on the cutting line projecting from the mowing head and tends to slide the cutting line out of the seat defined between the fixed surface and the eccentric element, increases the force with which the eccentric element presses against the fixed surface, pinching the cutting line. This guarantees effective grip of the cutting line during operation.

These devices do not enable a convenient removal of possible residue of the cutting line, which can remain blocked in the anchorage member and that must be replaced with new lengths of cutting line. Furthermore, the operations of production and assembly of the anchorage members are complex and far from reliable.

In some practical embodiments of the above known devices, manufactured by the company Kwik Products, Inc., USA, to enable release of the cutting line and replacement of a worn-out cutting line with a new one, the eccentric elements have a dorsal tab, which projects in the direction of the axis of the mowing head, and on which the user can act to release the residue of cutting line. This solution, albeit solving some problems of the devices described in the U.S. patents cited above, calls for a particular configuration of the mowing head, which cannot be produced closed, and is thus liable to accumulate debris inside it. Furthermore, the operations of release of the cutting line are far from convenient.

Described in U.S. Pat. No. 4,062,115 is a grass-cutting device with a mowing head to which lengths of cutting line are engaged via insertion, in pairs of adjacent holes, of two stretches of one and the same length of line, which is then blocked via a body that is screwed within the mowing head. The replacement of the worn-out lines is a complex and long operation.

Described in the U.S. Pat. No. 4,199,926 is a mowing head in which the main body is formed by a disk-like member with a hole for anchorage to the motor shaft. Approximately radial seats made in the disk-like body receive the ends of lengths of cutting line that project radially from the body itself. The lengths are fixed in the corresponding seats by means of screw members that squeeze the cutting line within its own seat. The clamping is not particularly reliable and moreover the operations of replacement of the lengths of worn-out cutting line are long and complex and call for purposely designed tools. Described in the U.S. Pat. Nos. 4,756,146 and 5,433,006 are mowing heads in which the lengths of cutting line are anchored by being inserted within a tortuous path made in the disk-like body of the mowing head. Also in this case, the insertion of the lengths of cutting line and their replacement following upon wear is a complex and long operation.

Described in the U.S. Pat. No. 4,905,465 is a mowing head in which individual lengths of cutting line are inserted in pairs of adjacent holes to assume a U-shaped conformation. Particular solutions are not envisaged for secure anchorage of the lines to the mowing head.

Described in the U.S. Pat. No. 5,303,476 is a mowing head in which a single length of cutting line is anchored in a diametral position to project with its own ends in diametrally opposite points of the mowing head. An elastic lever is provided for engaging the length of cutting line.

U.S. Pat. No. 5,023,998 describes a mowing head in which lengths of cutting line are applied in a diametral position to project with both of its ends from the mowing head itself. Anchorage is obtained by causing the cutting lines to describe a tortuous path within the body that forms the mowing head. The insertion of the cutting lines in this path is a highly complex and troublesome operation.

OBJECTS AND SUMMARY OF INVENTION

An object of the present invention is to provide a mowing head of the type initially mentioned, and in particular of the type using lengths of cutting line anchored to a body of the mowing head, which is of simpler and more reliable construction and of more practical use as compared to known mowing heads.

Basically, provided according to the invention is a mowing head comprising: a body which can be engaged to a motor shaft and defines a peripheral edge; and at least one member for anchorage of a cutting line, with an elastically loaded eccentric oscillating element, which co-operates with a contrast surface fixed to the body of the mowing head for anchoring the cutting line. According to one embodiment of the invention, the oscillating element projects from the peripheral edge of the body of the mowing head with a knurled edge, which forms a gripping surface for causing oscillation of the oscillating element and release of the cutting line.

In an advantageous embodiment of the invention, the oscillating element is partially surrounded by the contrast surface, which gradually approaches the oscillating element, defining an area of insertion and engagement of the cutting line of variable width, from a mouth of larger dimensions up to a point for anchorage of the cutting line between the contrast surface and the oscillating element.

In a practical embodiment of the invention, the contrast surface will define a seat for said oscillating element, which is open along an elongated slit on the perimetral surface of the body of the mowing head, the oscillating element projecting from said elongated slit in an off-centre position. The cutting line is fed between one end of the slit and the oscillating element and is blocked approximately at the opposite end of said elongated slit.

In a practical embodiment, the knurled edge forms an engagement surface for engaging the cutting line, the oscillating element being set so that said knurled edge pinches the cutting line against the contrast surface fixed to the body of the mowing head. The centrifugal force acting on the cutting line when the mowing head is in rotation tends to increase the pressure exerted by the oscillating element against said contrast surface.

According to an advantageous embodiment of the invention, the conformation of the members for anchorage of the cutting line is such that, in a position where the cutting line is mounted and anchored to the mowing head, during rotation said cutting line is wound around the oscillating element for an angle greater than 180°. Advantageously, the oscillating element can form a rest for the cutting line during rotation of the mowing head.

Preferably, the eccentric oscillating element has a circular cross section and is supported about an axis of oscillation that is eccentric with respect to the centre of the circular cross section.

In a practical embodiment, the contrast surface with which the oscillating element co-operates for clamping the cutting line has a concave curvilinear development, for example approximately in the shape of a spiral, and delimits a seat for housing said oscillating element, said seat being open on the peripheral edge of the body of the mowing head.

In a practical embodiment, the concave curvilinear surface defines, along with the perimetral edge of the oscillating element, a channel for inserting and guiding the cutting line, said channel having a decreasing cross section, with a mouth of larger dimensions on the peripheral edge and an area with a smaller cross section, in which the cutting line is elastically gripped between the oscillating element and said concave curvilinear surface.

Further advantageous features and improvements of the present invention are disclosed here below with reference to an exemplary embodiment of the invention and are set forth in the accompanying claims.

BRIEF DESCRIPTION OF THE DRAWING

The invention will be better understood from the ensuing description and the attached drawings, which show a non-limiting practical embodiment of the invention. More in particular, in the drawings.

DETAILED DESCRIPTION OF AN EMBODIMENT OF THE INVENTION

Figure 2:
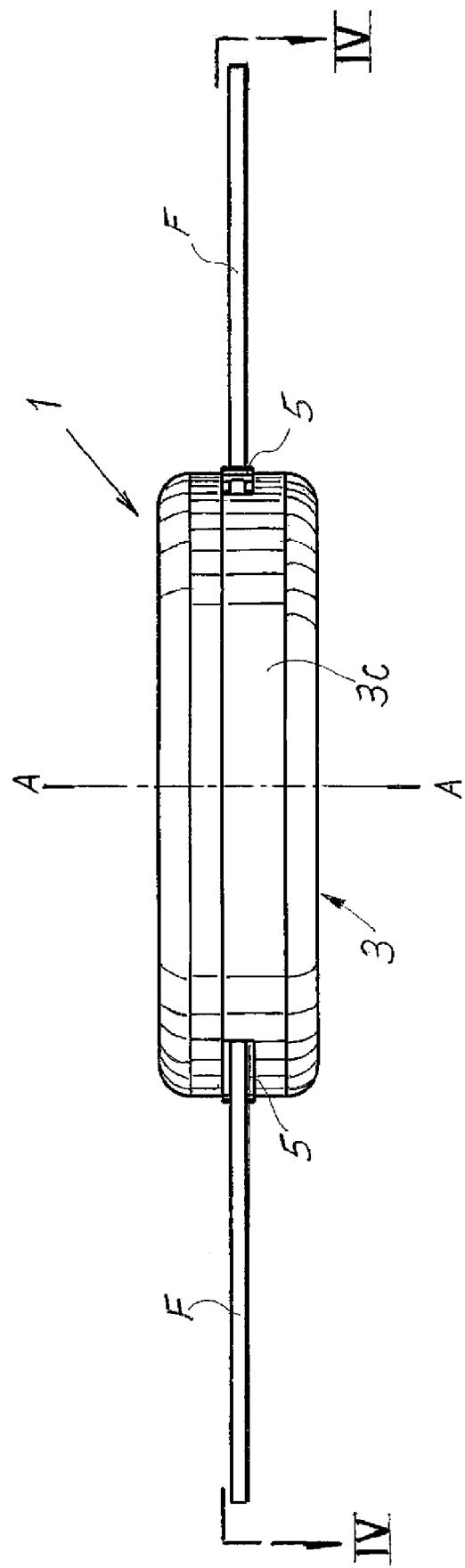
FIG. 2 is a side view of the mowing head assembled, with the lengths of cutting line anchored to the body of the mowing head.
Figure 3:
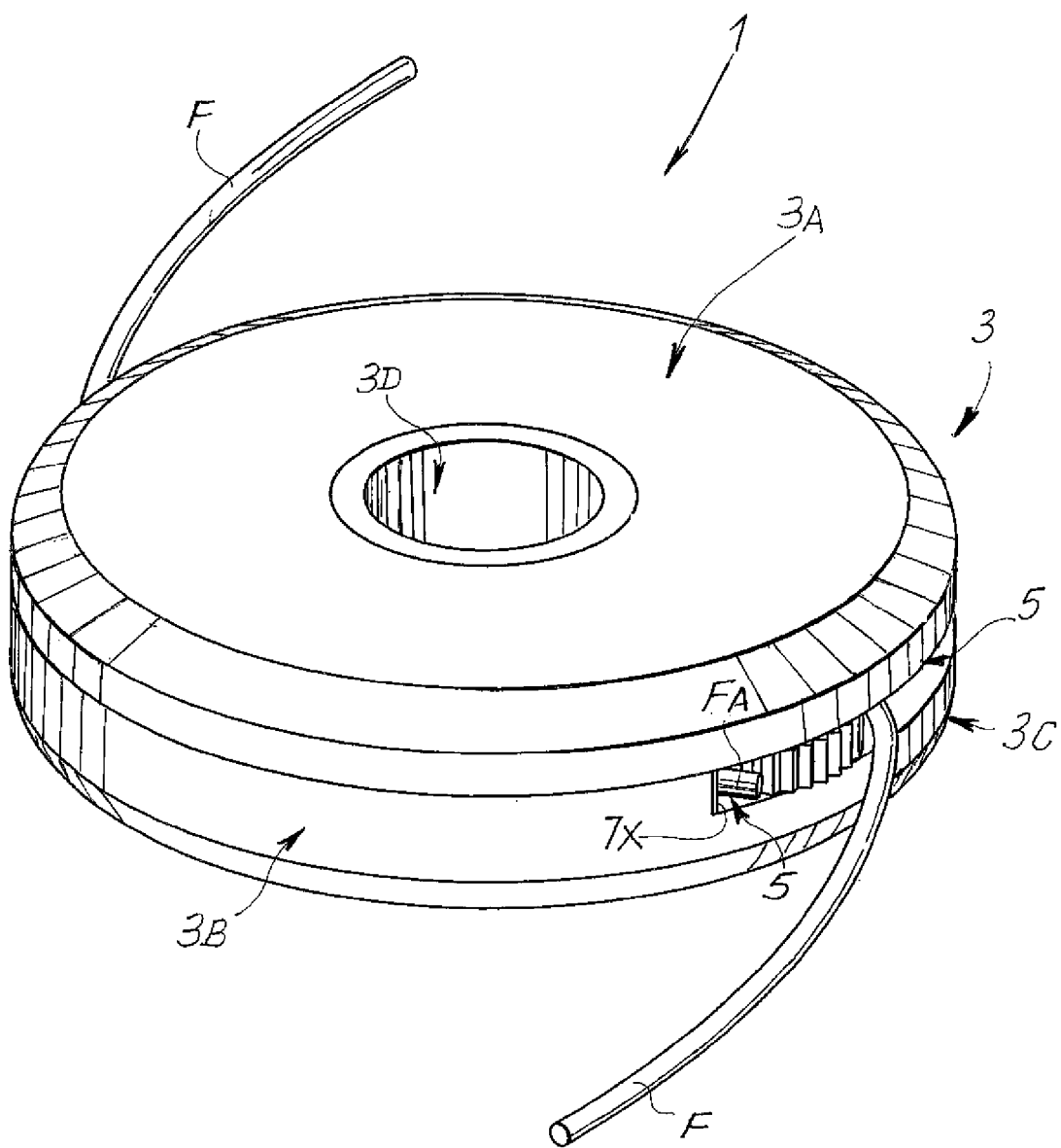
FIG. 3 is a perspective view of the mowing head of FIG. 2.

In a possible embodiment, the mowing head, as a whole designated by 1, comprises a body 3, which is formed by two disk-like portions designated by 3A and 3B, respectively. The two disk-like portions 3A, 3B are coupled together along a plane of coupling of trace IV-IV (FIG. 2), orthogonal to the axis A-A of rotation of the mowing head.

Once coupled together, the two disk-like portions 3A, 3B define a body that is substantially closed except for two tangential slits 5 made along the peripheral, i.e., perimetral, edge 3C of the body 3 of the mowing head. Furthermore, the body 3 formed by the coupling of the portions 3A, 3B has a central hole 3D, which is co-axial to the axis of rotation A-A of the mowing head. This through hole enables anchorage of the mowing head 1 to a rotating hub or shaft of a brush cutter or other machinery in two different positions, which are rotated through 180° with respect to one another, about an axis orthogonal to the rotation axis A-A (i.e., with the portion 3A or the portion 3B of the body 3 facing the motor shaft alternatively).

The two disk-like portions 3A, 3B can be joined together by bonding, welding, with screw means (not illustrated), or in any other suitable way (herein not represented for reasons of simplicity). The mutual coupling of the two disk-like portions 3A, 3B can be irreversible, given that (as will be clarified in what follows) normal use of the mowing head does not require uncoupling of the two disk-like portions 3A, 3B forming the body 3.

In the bottom disk-like portion 3B (in the drawing) are two seats 7 for housing corresponding anchorage members for anchoring lengths of cutting line. The seats 7 are delimited, not only by the approximately substantially plane surface 7A made in the disk-like portion 3B, but also by a curvilinear surface 7B, which is orthogonal to the surface 7A and has an approximately spiral development (see FIGS. 4A, 4B and 5). On top, each seat 7 is delimited by the bottom surface of the disk-like portion 3A, which can be planar.

Figure 1:
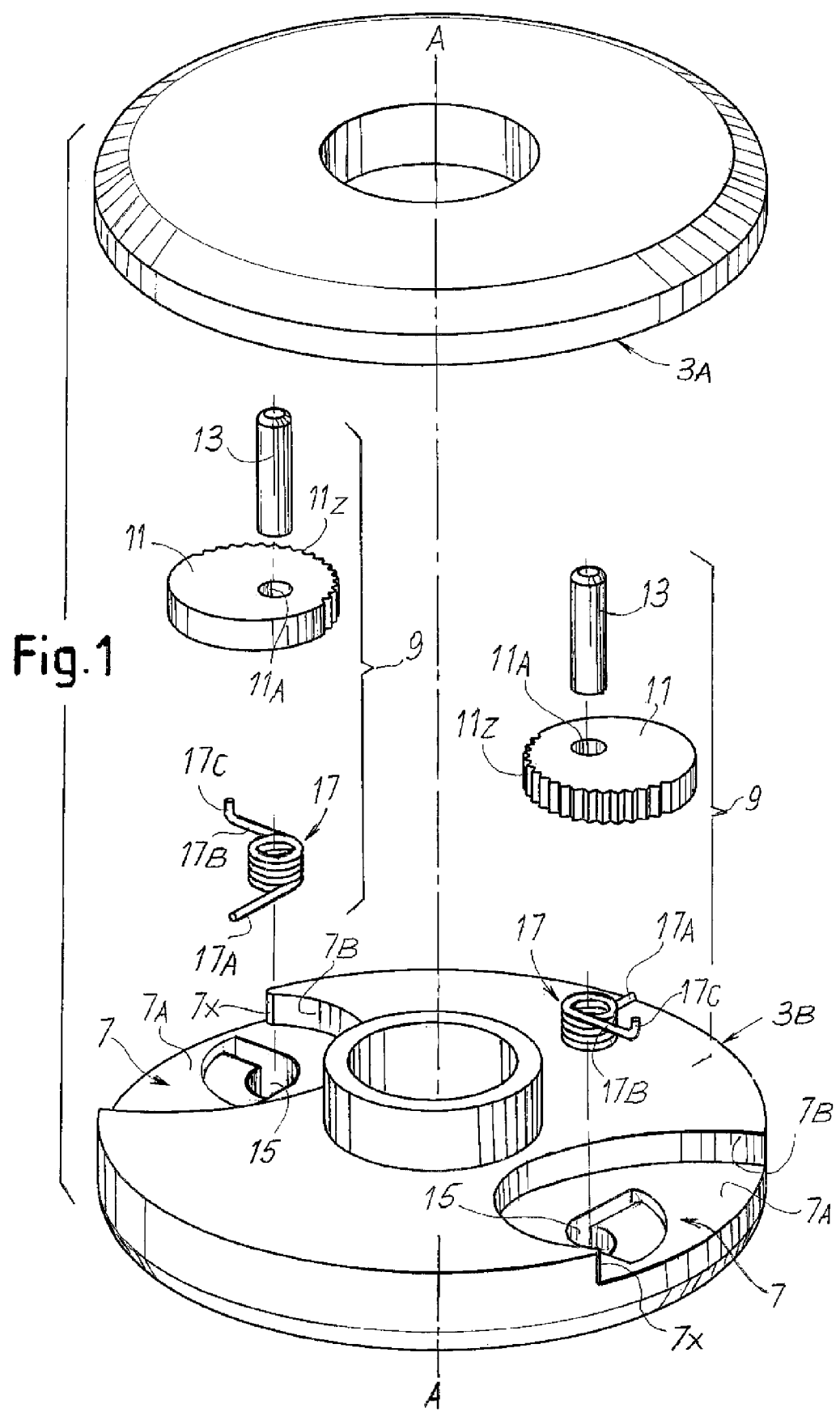
FIG. 1 is an exploded perspective view of a mowing head according to the invention.

Inserted within each of the two seats 7 is a corresponding anchorage member, as a whole designated by 9, the components of which are illustrated in isolation in the exploded view of FIG. 1.

More in particular, each anchorage member 9 comprises an eccentric oscillating element 11, of substantially circular cross section, mounted in the corresponding seat 7. Said eccentric element 11 can oscillate about the axis of a pin 13, inserted in a through hole 11A of the element 11. Each pin 13 is inserted in a hole (which may be blind) 15, made in the surface 7A of the corresponding seat 7. A corresponding blind hole is made also in the top disk-like portion 3A, so that each of the two pins 13 is engaged in two opposed and coaxial blind holes in the portions 3A and 3B of the body 3 of the mowing head 1.

The hole 15 is sized in such a way as to be able to receive, in addition to the pin 13, also an elastic member made in the form of a helical spring 17. The line forming the helical spring 17 has appendages 17A and 17B. The appendage 17A is engaged in the appropriately shaped cavity constituted by the hole 15, whilst the appendage 17B has a bent end 17C that is engaged in a corresponding hole (not illustrated) made on the bottom face of the corresponding eccentric oscillating element 11. With this arrangement, when the member 9 is assembled, the helical spring 17 loads the eccentric oscillating element 11 in a resting position, from which the element itself can be made to oscillate, torsionally deforming the helical spring 17.

As may be noted in FIG. 1, provided on a part of the perimetral development of each of the elements 11 is a knurling 11Z for the purposes that will be clarified hereinafter.

The eccentric oscillating elements 11 are mounted (see in particular FIGS. 4A, 4B and 5) in the respective seats 7 in such a way as to project through the respective slit 5 with at least one portion of the respective knurling 11Z. It is possible to act on this knurled part of the edge of each eccentric oscillating element 11 to bring about an oscillation of the eccentric oscillating element 11 for the purpose of releasing the cutting line and enabling its replacement in the event of wear.

Figure 4:
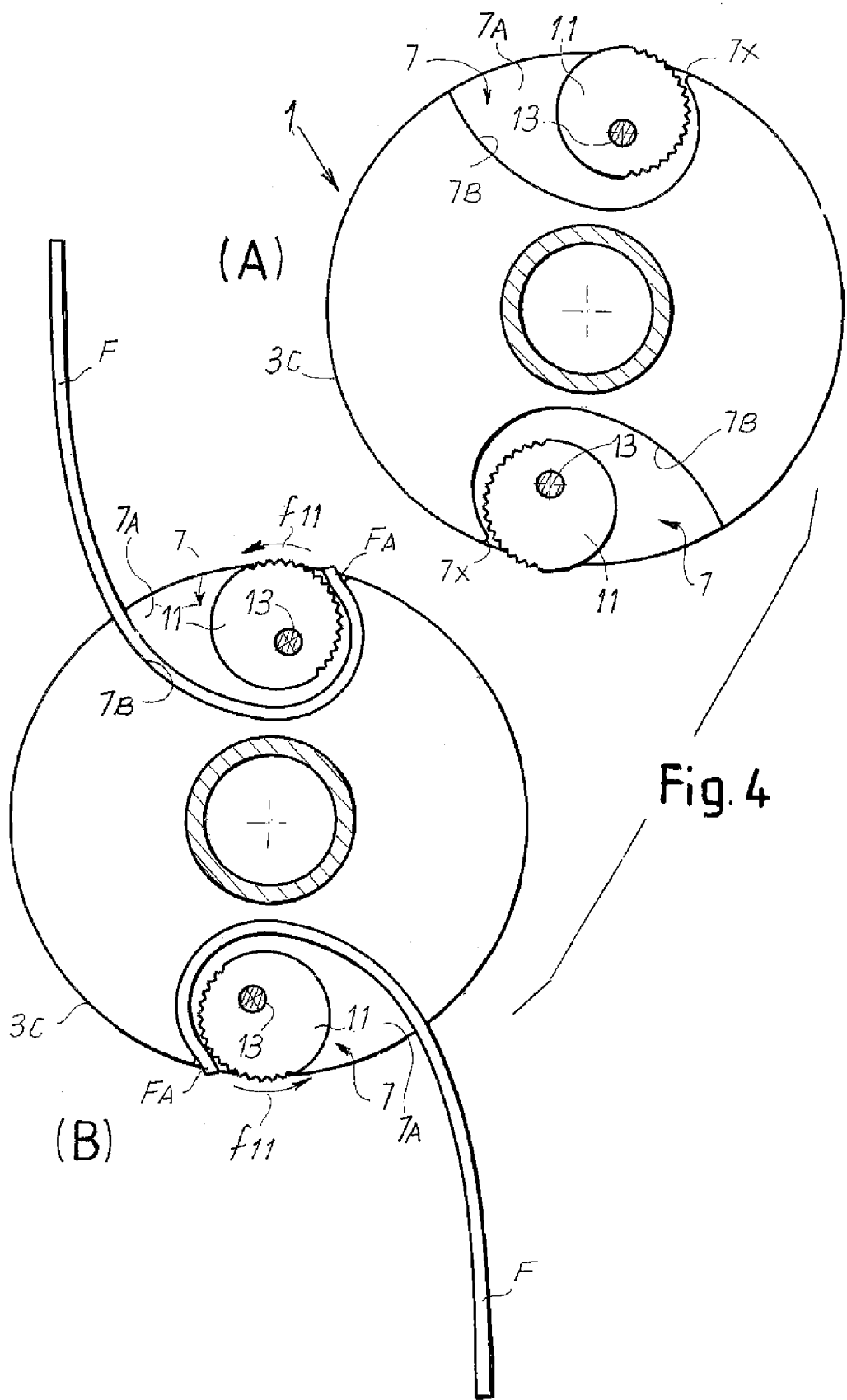
FIGS. 4A and 4B are cross sections according to the plane of trace IV-IV of FIG. 2 of the mowing head without the cutting lines (FIG. 4A) and with the cutting lines inserted (FIG. 4B)
Figure 5:
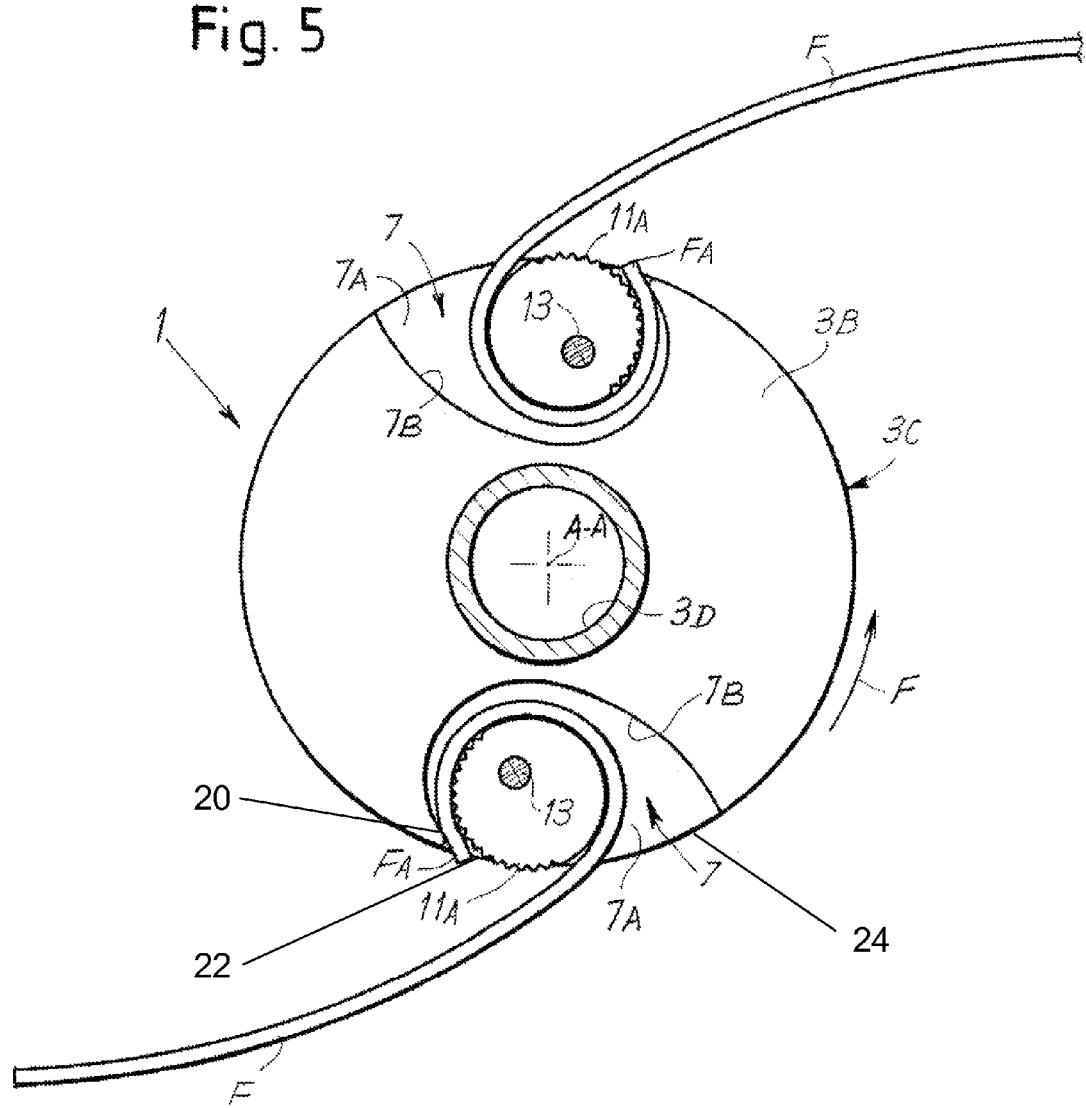
FIG. 5 is a cross-sectional view similar to the cross section of FIG. 4, illustrated in which is the configuration that the cutting lines assume when the mowing head is in rotation about its own axis.

As may be noted in particular in FIGS. 4A, 4B and 5, in each of the seats 7 the surface 7B with approximately spiral-shaped development defines, together with the circular edge of the respective eccentric oscillating element 11, a channel with a cross section progressively decreasing from a mouth that is located on the perimeter of the body 3 of the mowing head 1 at the slit 5 up to a restriction at a rounded-off edge 7X with which the curved surface 7B terminates. The rounded-off edge 7X is located basically on the circular perimetral edge 3C of the body 3. The eccentric oscillating element 11 of each anchorage member 9 is elastically loaded against the respective rounded-off edge 7C or in any case towards a position in which it is located at a distance from said edge smaller than the diameter of the cutting line F. The oscillating element 11 presses a portion of the cutting line against a portion of the curved surface 7B. A radial distance of the portion of the curved surface 9 from the rotation axis of the body 3 is greater than a radial distance of the oscillating axis of the oscillating element 11 from the rotation axis.

Insertion and anchorage of the cutting line F to the mowing head 1 presented herein is obtained as described here below (see in particular FIGS. 4A, 4B). Inserted in each of the two seats 7 is the first end $F_A$ of a length of cutting line F. Insertion is made through the mouth of the channel with variable cross section defined by the surface 7B and by the perimetral edge of the respective eccentric oscillating element 11. The cutting line is conveniently guided towards the area with smaller cross section of this channel, sliding on the curved surface 7B and wedging between the knurled portion 7Z of the edge of the eccentric oscillating element 11 and the rounded-off terminal edge 7X of the curved surface 7B, as may be noted in FIG. 4B, where the two lengths F of cutting line have been completely inserted and anchored in the mowing head. The rounded-off terminal edge 7X has a pinching surface 20 wherein the oscillating element presses the cutting line against the pinching surface 20 during rotation of the mowing head 1 (see FIG. 5). The slit 5 has a first portion 22 defined by at least a portion of the oscillating element 11 and the rounded-off terminal edge 7X. The slit 5 has a second portion 24 defined by at least another portion of the oscillating element 11 and an end of the curvilinear surface 7B.

To remove the lengths of cutting line F, for example if these are excessively worn or broken, it is sufficient to act from outside the mowing head on the knurled portion 11Z projecting from the mowing head itself, through the slit 5 of the body 3 to bring about an oscillation according to the arrow f11 (FIG. 4B) about the axis of the pin 13 of the corresponding eccentric oscillating element 11. This movement of oscillation releases the end $F_A$ of the cutting line F and enables convenient extraction and subsequent replacement thereof with a new length of cutting line.

When the mowing head 1 is made to rotate in the direction indicated by the arrow f in FIG. 5, the centrifugal force tends to extend the lengths of cutting line F radially. This pulling action, thanks to the fact that the lengths of line are wound through a wide angle (in a possible embodiment, said angle being wider than 180°) around the respective eccentric oscillating elements 11, means that said elements are forced into the gripping position; i.e., they are tendentially made to oscillate in a direction opposite to the direction indicated by the arrow f11 in FIG. 4B. This guarantees a secure retention of each of the lengths of cutting line F during rotation of the mowing head 1. The force exerted by the vegetation that is cut by the lines F during rotation of the mowing head causes, on the other hand, a curving of the cutting lines F, as illustrated in FIG. 5. By so curving, the cutting lines F rest on the circular edge of the respective oscillating elements 11, which consequently form a rest with ample curvature for the lines themselves, so reducing the risk of breakage due to the mechanical stresses exerted by the vegetation or by possible obstacles, such as sharp edges of flower beds, stones, clods of earth or the like, on the cutting lines themselves.

Thanks to the fact that the mowing head can be fitted on the motor shaft in two distinct positions, the direction of rotation f of the mowing head itself will once again be the one indicated in FIG. 5, irrespective of the direction of rotation of the motor shaft. Purposely provided indications on the two faces of the mowing head can be useful to the user for mounting the mowing head always in the correct way according to the direction of rotation (clockwise or counterclockwise) of the motor shaft of the device on which the mowing head itself is installed.

It is understood that the drawings just show one example, provided merely as practical demonstration of the invention, it being possible for said invention to vary in the shapes and arrangements without on the other hand departing from the scope of the idea underlying the invention itself.

What I claim is:

1. A mowing head comprising:
a body engageable to a motor shaft, said body having a peripheral edge, said body comprising a first disk portion and a second disk portion, said first disk portion being coupled to said second disk portion, wherein said first disk portion and said second disk portion define said peripheral edge, said body having a rotation axis, a concave curvilinear continuous surface including a contrast surface and a seat, said contrast surface being fixed to said body, said contrast surface being defined by at least a portion of said concave curvilinear continuous surface, said seat being delimited by said concave curvilinear continuous surface and two opposite surfaces, said contrast surface comprising a pinching portion, said concave curvilinear continuous surface being arranged between said two opposite surfaces, said first disk portion and said second disk portion defining an elongated slit arranged on said peripheral edge with said elongated slit having elongated sides extending in a circular direction of said peripheral edge, said elongated slit having a first end and a second end, said first end being opposite said second end, said concave curvilinear continuous surface being delimited between said first end and said second end;
a cutting line having an end portion; and
an anchorage member for anchoring said cutting line, said anchorage member including an elastically loaded eccentric oscillating element, a pin and a helical spring, said helical spring being set about said pin, said oscillating element having an oscillating axis positioned within said seat, said oscillating element cooperating with said pinching portion, said oscillating element having a knurled edge, said knurled edge projecting from said peripheral edge to form a gripping surface for oscillating the oscillating element and releasing the cutting line, the cutting line being inserted between said first end of said elongated slit and said oscillating element, wherein said oscillating element presses said end portion of the cutting line against said at least said portion of said concave curvilinear continuous surface at least at or adjacent to said first end, said pinching portion corresponding to said at least said portion of said concave curvilinear continuous surface against which the cutting line is pressed during rotation of said body, wherein a radial distance of each point of said pinching portion from said rotation axis of said body is greater than a radial distance of said oscillating axis of said oscillating element from said rotation axis, said oscillating element being connected to at least one of said two opposite surfaces via said pin with said helical spring set thereon such that said oscillating element is elastically pivotable about an axis thereof, wherein a majority portion of said helical spring is housed in a cavity in said seat, said majority portion of said helical spring being located in said cavity at a position below said seat.

2. A mowing head according to claim 1, wherein the oscillating element projects from said elongated slit in an off-center position, wherein said oscillating element is partially surrounded by said contrast surface, which approaches the oscillating element so as to define an area of insertion and engagement of the cutting line of variable width, wherein said contrast surface and at least a portion of said oscillating element define a point for anchorage of the cutting line, said point for anchorage of the cutting line being located at or adjacent to said first end, wherein a dimension of said area of insertion and engagement decreases from said second end to said first end.

3. A mowing head according to claim 1, wherein said gripping portion of said oscillating element is a knurled edge, said knurled edge forming a surface of engagement of the cutting line, the oscillating element engaging said portion of said cutting line such that said knurled edge pinches the cutting line against said pinching portion of said contrast surface and the centrifugal force acting on the cutting line when the mowing head is in rotation increases the pressure exerted by the oscillating element against said contrast surface.

4. A mowing head according to claim 1, wherein during rotation said cutting line is wound around said oscillating element through an angle greater than 180° when said cutting line is mounted and anchored to said body, wherein at least a portion of said cutting line extending from a position at or adjacent to said first end to a position outside of said body.

5. A mowing head according to claim 1, wherein said oscillating element forms a rest for said cutting line during rotation of the mowing head.

6. A mowing head according to claim 1, wherein said oscillating element has a circular cross section and is supported about an axis of oscillation that is eccentric with respect to a center of the circular cross section.

7. A mowing head according to claim 1, wherein said concave curvilinear surface and said oscillating element defines a channel for inserting and guiding the cutting line, said channel having a decreasing cross section, said channel having a mouth on the peripheral edge and a gripping area, the cutting line being elastically gripped between the oscillating element and said concave curvilinear surface in said gripping area, said mouth having a first cross sectional dimension, said gripping area having a second cross sectional dimension, said first cross sectional dimension being greater than said second cross sectional dimension.

8. A mowing head according to claim 7, wherein said concave curvilinear surface terminates with an edge rounded-off on the peripheral edge of the body of the mowing head in said gripping area of said channel, said oscillating element gripping the cutting line against said rounded-off edge.

9. A mowing head according to claim 7, wherein a dimension of a cross section of said inserting and guiding channel in the gripping area is increased based on movement of said gripping portion of said oscillating element.

10. A mowing head according to claim 1, wherein said seat is delimited by concave continuous curvilinear surface provided with said contrast surface and by a pair of substantially plane walls orthogonal to an axis of rotation of said body.

11. A mowing head according to claim 1, wherein said elastic member is a helical spring that operates as a torsion spring, said helical spring having an appendage constrained in said cavity and one end of said helical spring being constrained to the oscillating element.

12. A mowing head according to claim 1, wherein a plurality of said anchorage members are distributed in a substantially symmetrical along the perimetral development of said body, each of said anchorage members comprising a corresponding eccentric oscillating element.

13. A mowing head according to claim 1, wherein said body has a connection device for connection to a motor shaft such that said body is mounted in one of a first position and a second position, said first position being 180° about an axis orthogonal to the axis of rotation of said body from said second position, said body rotating in one of a clockwise and a counterclockwise direction of rotation when said body is in said first position, said body rotating in another of said clockwise and said counterclockwise direction of rotation when said body is in said second position.

14. A mowing head according to claim 1, wherein the body is formed by two disk portions, coupled together approximately in a plane of coupling orthogonal to an axis of rotation of the body, said oscillating element of at least one said anchorage member being housed between said two disk portions, one of said two opposite surfaces and said concave continuous curvilinear surface being provided in one of said first disk portion and said second disk portion, another one of said two opposite surfaces being provided in another one of said first disk portion and said second disk portion.

15. A mowing head according to claim 14, wherein said two disk portions coupled together form a closed body except for slits along the peripheral edge of said body, said cutting line and said gripping portion of said oscillating element extending through at least one of said slits.

16. A mowing head according to claim 1, wherein said oscillating element oscillates in a direction of rotation of said body, said cutting line being released from said contrast surface when said oscillating element oscillates in said direction of rotation of said body.

17. A mowing head according to claim 1, wherein said oscillating element oscillates with said gripping portion from said contrast surface in a direction of said insertion area, said cutting line being released from said contrast surface when said oscillating element oscillates in a direction of said insertion area.

18. A mowing head according to claim 1, further comprising a pin, wherein said body has an outer circumferential edge and a seat hole defined in said seat, said outer circumferential edge defining a portion of said seat, said oscillating element having an oscillating element hole, said pin extending through said oscillating element hole, said seat hole receiving one end of said pin, said pin and said seat hole being located at a spaced location from said outer circumferential edge.

19. A mowing head, comprising:
a body structure for connecting to a motor shaft, said body structure including a body axis of rotation, a peripheral edge, and a contrast surface, said body structure comprising a side portion, said body structure comprising an elongated slit, said elongated slit being arranged on said peripheral edge on said side portion, said elongated slit extending in a circular direction of said peripheral edge, said elongated slit having a first end and a second end, said contrast surface extending continuously between said first end and said second end;
a cutting line having a cutting line end portion;
an anchorage member for fixing said cutting line, said anchorage member including an elastically loaded eccentric oscillating element, said oscillating element having a gripping portion for rotating said oscillating element and for releasing said cutting line, said gripping portion extending to a location outside of said peripheral edge, said contrast surface defining at least a portion of a seat of said body, said oscillating element being arranged in said seat, said peripheral edge including an insertion area, said contrast surface being located opposite said insertion area, said contrast surface including a pinching surface portion, said insertion area receiving at least a portion of said cutting line such that said cutting line end portion is fixed via said pinching surface and said oscillating element at least at or adjacent to said first end of said elongated slit to define a curved portion of said cutting line, said curved portion of said cutting line extending about said oscillating element, said oscillating element being mounted for movement such that said gripping portion is rotatable from said contrast surface in a direction of said insertion area, said cutting line end portion being released from said pinching surface when said gripping portion is rotated in said direction of said insertion area, each portion of said oscillating element pressing said cutting line end portion in contact with each portion of said pinching surface and said body axis of rotation defining a first radial distance, said oscillating element axis of rotation and said body axis of rotation defining a second radial distance, said first radial distance being greater than said second radial distance.

20. A mowing head according to claim 19, wherein said gripping portion of said oscillating elements is rotatable in a direction of rotation of said body such that said cutting line is released from said contrast surface when said gripping portion rotates in said direction of rotation of said body.

21. A mowing head according to claim 19, wherein:
said oscillating element has a circular cross section, said oscillating element being supported about an axis of rotation that is eccentric with respect to a center of said circular cross section;
said gripping portion of said oscillating element is a knurled edge, said knurled edge forming a surface of engagement of said cutting line, said oscillating element being arranged in said seat such that said knurled edge presses said cutting line against said contrast surface and a centrifugal force acting on said cutting line increases pressure exerted by said oscillating element against said contrast surface when said body is rotated;
said curved portion of said cutting line engages a circumferential portion of said oscillating element when said body is rotated;
said cutting line is wound around said oscillating element through an angle greater than 180° when said cutting line is mounted to said body and said body is rotated.

22. A mowing head according to claim 19, further comprising a pin, wherein said body structure has an outer circumferential edge and a seat hole defined in said seat, said outer circumferential edge defining a portion of said seat, said oscillating element having an oscillating element hole, said pin extending through said oscillating element hole, said seat hole receiving one end of said pin, said pin and said seat hole being located at a spaced location from said outer circumferential edge.

23. A mowing head according to claim 19, wherein said body comprises a first disk portion and a second disk portion, said first disk portion being coupled to said second disk portion, wherein said first disk portion and said second disk portion define said peripheral edge, said contrast surface being fixed to said body, said first disk portion having a first disk portion inner surface, said second disk portion having a second disk portion inner surface, said first disk portion inner surface being opposite said second disk portion inner surface, one of said first disk portion inner surface and said second disk portion inner surface and said contrast surface defining said seat, said anchorage member comprising a pin and a helical spring, said helical spring being set about said pin, said oscillating element being elastically pivoted to at least one of said first disk portion and said second disk portion via said pin with said helical spring set thereon, wherein at least a portion of said helical spring is housed in a cavity defined in said seat, said portion of said helical spring being located in said cavity at a position below said one of said first disk portion inner surface and said second disk portion inner surface.

24. A mowing head comprising:
a body engageable to a motor shaft, said body having a side portion, said body comprising a first disk portion and a second disk portion, said first disk portion being coupled to said second disk portion, said first disk portion comprising a first peripheral edge and a first disk portion inner surface, said second disk portion comprising a second peripheral edge and a second disk portion inner surface, one of said first disk portion inner surface and said second disk portion inner surface defining a seat, said body having a rotation axis and a concave curvilinear continuous surface including a contrast surface, said contrast surface being fixed to said body, said contrast surface being defined by at least a portion of said concave curvilinear continuous surface, said seat being delimited by said concave curvilinear continuous surface and another one of said first disk portion inner surface and said second disk portion inner surface, said first disk portion inner surface being opposite said second disk portion inner surface, said contrast surface comprising a pinching portion, said concave curvilinear continuous surface being arranged between said first disk portion inner surface and said second disk portion inner surface, said first peripheral edge and said second peripheral edge defining an elongated slit arranged on said side portion, said elongated slit extending in a circular direction of said first peripheral edge and said second peripheral edge, said elongated slit having a first end and a second end, said first end being opposite said second end, said concave curvilinear continuous surface extending continuously between said first end and said second end;
a cutting line having an end portion; and
an anchorage member for anchoring said cutting line, said anchorage member including an elastically loaded eccentric oscillating element, a pin and a helical spring, said helical spring being set about said pin, said oscillating element having an oscillating axis positioned within said seat, said oscillating element cooperating with said pinching portion, said oscillating element having a knurled edge, said knurled edge projecting from said body to form a gripping surface for oscillating the oscillating element and releasing the cutting line, the cutting line being inserted between said first end of said elongated slit and said oscillating element, wherein said oscillating element presses said end portion of the cutting line against said at least a portion of said concave curvilinear continuous surface at at least a position at or adjacent to said first end of said elongated slit, said pinching portion corresponding to said at least said portion of said concave curvilinear continuous surface against which the cutting line is pressed during rotation of said body, wherein a radial distance of each point of said pinching portion from said rotation axis of said body is greater than a radial distance of said oscillating axis of said oscillating element from said rotation axis, said oscillating element being elastically pivoted to at least one of said first disk portion and said second disk portion via said pin with said helical spring set thereon, wherein a majority portion of said helical spring is housed in a cavity in said seat, said majority portion of said helical spring being located in said cavity at a position below said at least one of said first disk portion inner surface and said second disk portion inner surface.

* * * * *

UNITED STATES PATENT AND TRADEMARK OFFICE
CERTIFICATE OF CORRECTION

PATENT NO.       : 8,061,042 B2  
APPLICATION NO.  : 11/531131  
DATED            : November 22, 2011  
INVENTOR(S)      : Fabrizio Arnetoli Page 1 of 1

It is certified that error appears in the above-identified patent and that said Letters Patent is hereby corrected as shown below:

Title Page, Item (30)  
Correct - Foreign Application Priority Data - FI2005A000191  
(Error- FI05A000191)

Signed and Sealed this  
Tenth Day of January, 2012

David J. Kappos  
*Director of the United States Patent and Trademark Office*